(12) United States Patent
Lair

(10) Patent No.: US 6,966,175 B2
(45) Date of Patent: Nov. 22, 2005

(54) ROTARY ADJUSTABLE EXHAUST NOZZLE

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 105 days.

(21) Appl. No.: 10/838,623

(22) Filed: May 4, 2004

(65) Prior Publication Data

US 2005/0126174 A1 Jun. 16, 2005

Related U.S. Application Data

(60) Provisional application No. 60/469,382, filed on May 9, 2003.

(51) Int. Cl.[7] ............................................... F02K 3/02
(52) U.S. Cl. .................. 60/226.1; 60/770; 239/265.25
(58) Field of Search .......................... 60/226.1, 226.2, 60/226.3, 230, 770, 228, 229; 239/265.19, 239/265.25, 265.27, 265.31

(56) References Cited

U.S. PATENT DOCUMENTS

| | | | |
|---|---|---|---|
| 3,704,829 A * | 12/1972 | Hall | 239/265.35 |
| 3,724,759 A * | 4/1973 | Ellis | 239/265.29 |
| 3,779,010 A | 12/1973 | Chamay et al. | |
| 3,820,719 A | 6/1974 | Clark | |
| 4,291,782 A | 9/1981 | Klees | |
| 4,922,712 A | 5/1990 | Matta et al. | |
| 4,922,713 A | 5/1990 | Barbarin et al. | |
| 5,181,676 A | 1/1993 | Lair | |
| 5,221,048 A | 6/1993 | Lair | |
| 5,655,360 A | 8/1997 | Butler | |
| 5,685,141 A * | 11/1997 | Markstein et al. | 60/204 |
| 5,694,767 A | 12/1997 | Vdoviak et al. | |
| 5,778,659 A | 7/1998 | Duesler et al. | |
| 5,779,192 A | 7/1998 | Metezeau et al. | |
| 5,819,527 A | 10/1998 | Fournier | |
| 5,826,823 A | 10/1998 | Lymons et al. | |
| 5,853,148 A | 12/1998 | Standish et al. | |
| 5,863,014 A | 1/1999 | Standish | |
| 5,875,995 A | 3/1999 | Moe et al. | |
| 5,913,476 A | 6/1999 | Goindec et al. | |
| 5,934,613 A | 8/1999 | Standish et al. | |
| 6,070,407 A | 6/2000 | Newton | |
| 6,094,908 A * | 8/2000 | Baudu et al. | 60/226.2 |
| 6,101,807 A | 8/2000 | Goindec et al. | |
| 6,167,694 B1 * | 1/2001 | Davies | 60/226.2 |
| 6,598,386 B2 * | 7/2003 | Johnson et al. | 60/226.2 |
| 6,751,944 B2 * | 6/2004 | Lair | 60/226.3 |
| 2004/0112040 A1 * | 6/2004 | Kortum et al. | 60/204 |

FOREIGN PATENT DOCUMENTS

WO WO 03/036063 5/2003

* cited by examiner

*Primary Examiner*—Ehud Gartenberg
(74) *Attorney, Agent, or Firm*—Francis L. Conte

(57) ABSTRACT

An exhaust nozzle includes an exhaust duct with an outlet and a row of radial apertures upstream therefrom. A radial frame surrounds the duct upstream from the apertures. A row of flaps are hinged to the frame to selectively cover and uncover the apertures for controlling exhaust flow discharged therethrough. An arcuate unison bar surrounds the duct adjacent to the frame and includes circumferentially spaced apart cams engaging corresponding cam followers affixed to the flaps. An actuator is joined to the bar for selective rotation thereof between opposite first and second directions to pivot open and closed the flaps atop the apertures.

20 Claims, 9 Drawing Sheets

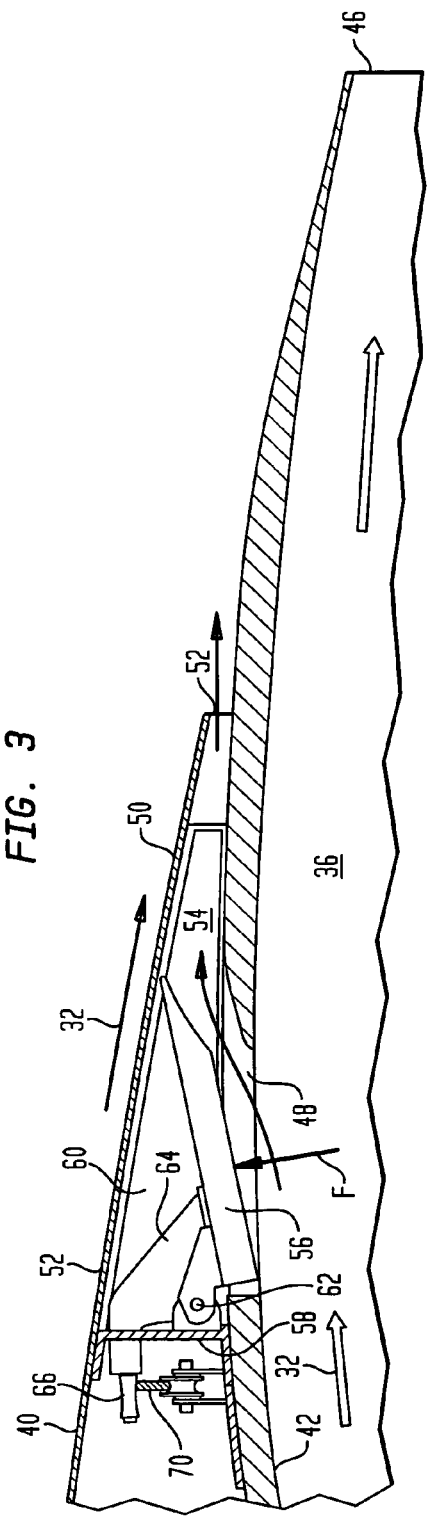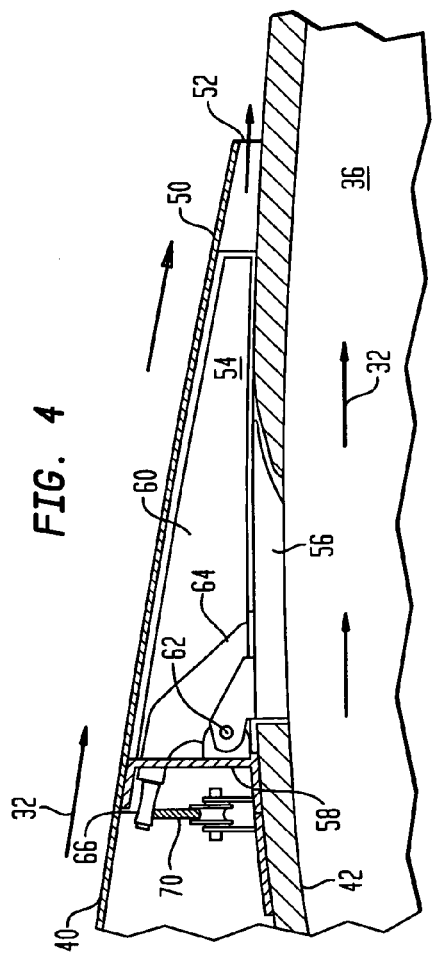

ROTARY ADJUSTABLE EXHAUST NOZZLE

This application claims the benefit of U.S. Provisional Application No. 60/469,382; filed May 9, 2003.

BACKGROUND OF THE INVENTION

The present invention relates generally to turbofan aircraft engines, and, more specifically, to exhaust nozzles therefor.

A typical turbofan aircraft engine includes a fan powered by a core engine. The core engine includes a surrounding cowl or nacelle, and the fan includes a corresponding cowl or nacelle at the forward end of the core engine which extends aft either in part or fully thereover.

The fan nacelle is spaced radially outwardly from the core nacelle to define an annular bypass duct therebetween. During operation, the core engine powers the fan which pressurizes ambient air to produce propulsion thrust in the fan air bypassing the core engine and discharged from the fan exhaust nozzle.

A portion of the fan air is channeled into the core engine wherein it is pressurized and mixed with fuel for generating hot combustion gases. Energy is extracted from the combustion gases in high and low pressure turbines which in turn power a compressor and the fan. The core exhaust gases are discharged from the core engine through a core exhaust nozzle and provide additional thrust for propelling the aircraft in flight.

In a typical short fan nacelle, the fan nozzle is spaced upstream from the core nozzle, and the fan exhaust is discharged separately from and surrounding the core exhaust. In a long nacelle, the fan nacelle extends aft of the core nozzle to provide a single common nozzle through which both the fan bypass air and core exhaust are discharged from the engine.

The fan nozzle and the core nozzle are typically fixed area nozzles, although they could be configured as variable area nozzles. Variable area nozzles permit adjustment of the aerodynamic performance of the engine which correspondingly increases complexity, weight, and cost of the nozzle.

Furthermore, turbofan aircraft engines typically include thrust reversers for use in providing braking thrust during landing of the aircraft. Various types of thrust reversers are found in the engine nacelle and further increase complexity, weight, and cost of the engine.

In U.S. Pat. No. 6,751,944 entitled "Confluent Variable Exhaust Nozzle," assigned to the present assignee, and incorporated herein by reference, an improved variable area exhaust nozzle is disclosed for a turbofan aircraft engine. The confluent nozzle includes outer and inner conduits, with a plurality of flaps therebetween. The flaps may be selectively opened to bypass a portion of exhaust flow from the inner conduit through the outer conduit in confluent exhaust streams from concentric main and auxiliary exhaust outlets.

In this way, the auxiliary outlet may be operated during takeoff operation of the aircraft for temporarily increasing exhaust flow area for correspondingly reducing velocity of the exhaust flow. Noise may therefore be reduced during takeoff operation using a relatively simple and compact variable area configuration.

However, the multiple flaps must be opened and closed in unison, and against the substantial pressure forces generated by the exhaust flow during operation. The actuation system for deploying and retracting the flaps must provide sufficient strength for carrying loads during operation, and must be contained within the available space provided in the nacelle without degrading aerodynamic performance or efficiency of the engine.

Accordingly, it is desired to provide an improved actuation system for deploying and retracting the row of flaps in unison during operation.

BRIEF SUMMARY OF THE INVENTION

An exhaust nozzle includes an exhaust duct with an outlet and a row of radial apertures upstream therefrom. A radial frame surrounds the duct upstream from the apertures. A row of flaps are hinged to the frame to selectively cover and uncover the apertures for controlling exhaust flow discharged therethrough. An arcuate unison bar surrounds the duct adjacent to the frame and includes circumferentially spaced apart cams engaging corresponding cam followers affixed to the flaps. An actuator is joined to the bar for selective rotation thereof between opposite first and second directions to pivot open and closed the flaps atop the apertures.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 4 is a partly sectional axial view, like FIG. 3, of the flap closed by the unison bar.

DETAILED DESCRIPTION OF THE INVENTION

Figure 1:
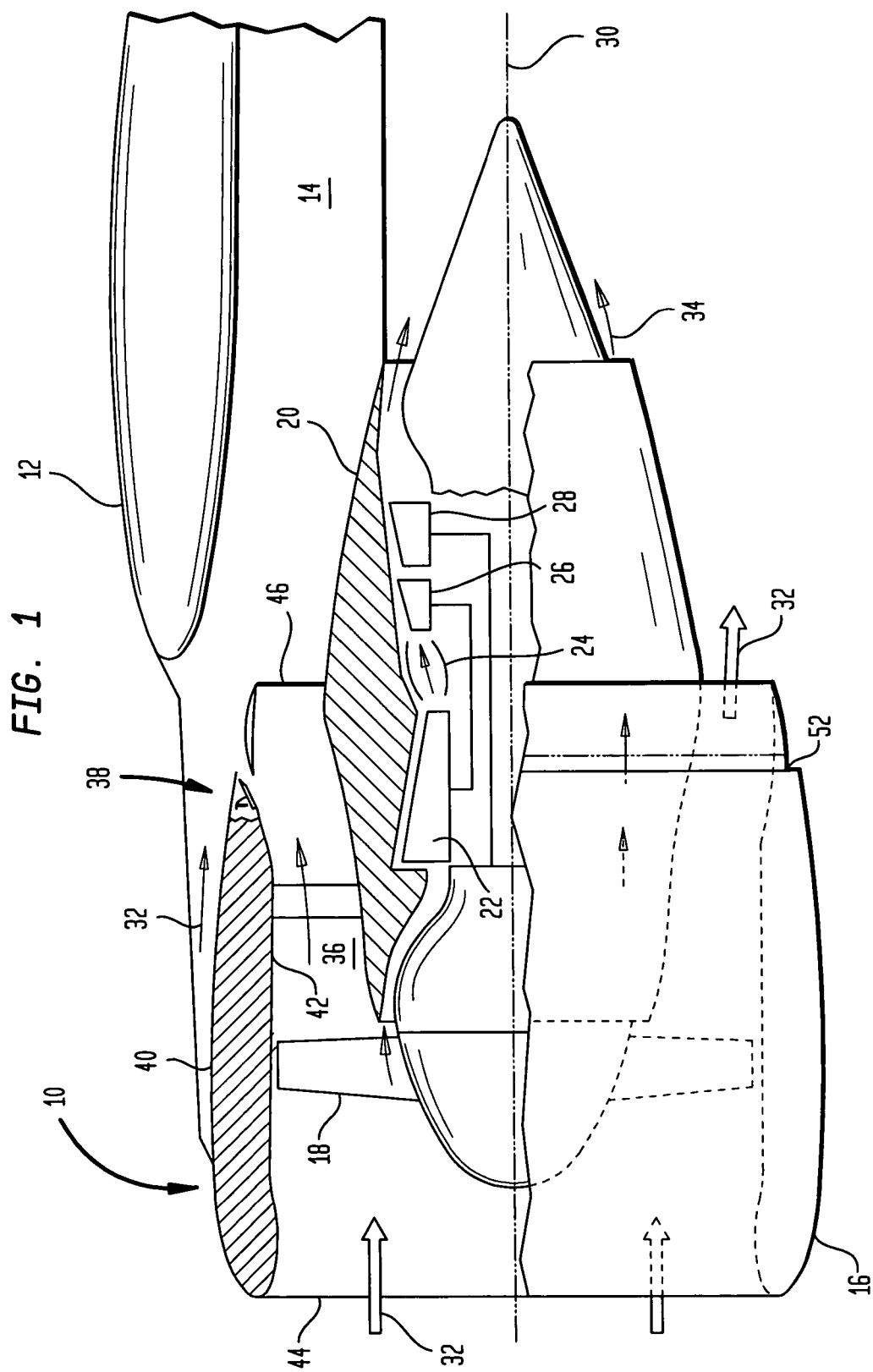
FIG. 1 is a partly sectional axial view of an exemplary turbofan aircraft gas turbine engine mounted to the wing of an aircraft and including a fan exhaust nozzle.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of air is pressurized by the driven fan 18 and bypasses the core engine through a substantially annular bypass duct 36 which terminates in a fan exhaust nozzle 38 for producing a substantial portion of the propulsion thrust which powers the aircraft in flight. The combustion gases 34 are exhausted from the aft outlet of the core engine for providing additional thrust.

The fan nacelle includes radially outer and inner cowlings or skins 40,42 which extend axially from a leading edge of the nacelle defining an annular inlet 44 to an opposite trailing edge defining an annular outlet 46. The fan nacelle may have any conventional configuration, and is typically formed in two generally C-shaped halves which are pivotally joined to the supporting pylon 14 for being opened during maintenance operation.

The exemplary fan nacelle illustrated in FIG. 1 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

In the exemplary embodiment illustrated in FIG. 1, the core engine is mounted concentrically inside the fan nacelle by a row of supporting struts in a conventional manner. The core cowl 20 is spaced radially inwardly from the inner skin 42 of the fan nacelle to define the bypass duct 36 therebetween which bypasses the major portion of the fan air around the core engine during operation. The fan bypass duct terminates in the annular, or partly annular fan nozzle 38 at the nacelle trailing edge or outlet 46.

Figure 2:
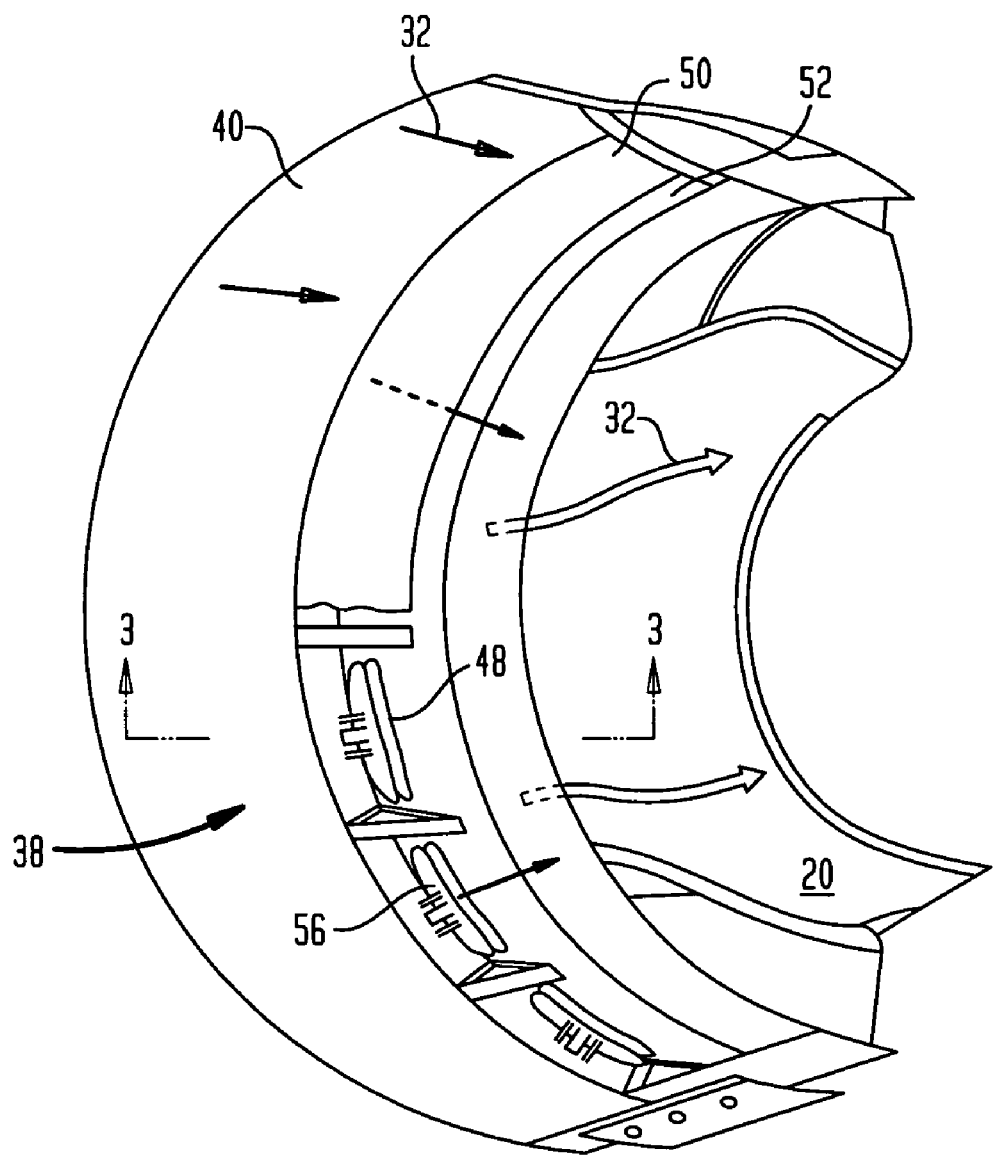
FIG. 2 is an aft-facing-forward isometric view of a portion of the fan nacelle and fan nozzle illustrated in FIG. 1.

The fan nozzle 38 illustrated in FIG. 1 is configured for variable area performance for reducing exhaust noise during aircraft takeoff operation. The variable fan nozzle 38 is illustrated in more detail in FIGS. 2–4 and includes the aft portion of the bypass duct 36 which defines an inner duct within the fan nacelle having the main outlet 46 at the aft end thereof. Spaced upstream from the main outlet 46 is a row of circumferentially spaced apart, radial inlet apertures 48.

Figure 3:
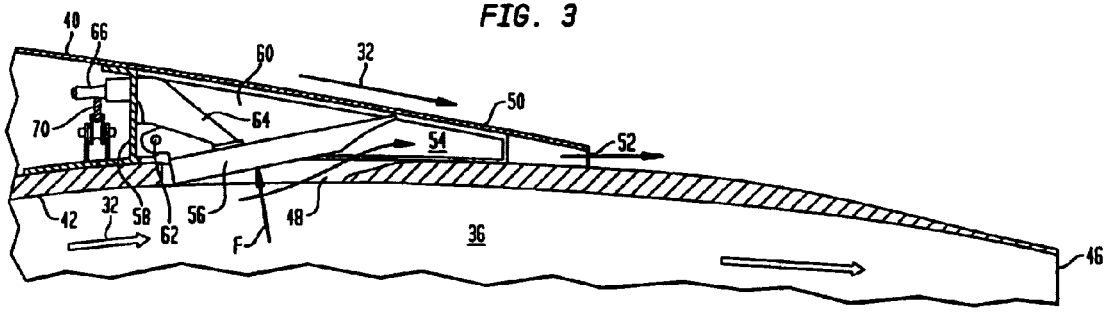
FIG. 3 is a partly sectional axial view through the fan nozzle shown in FIG. 2 and taken along line 3—3, and illustrating one of the flaps opened by a unison bar.
Figure 7:
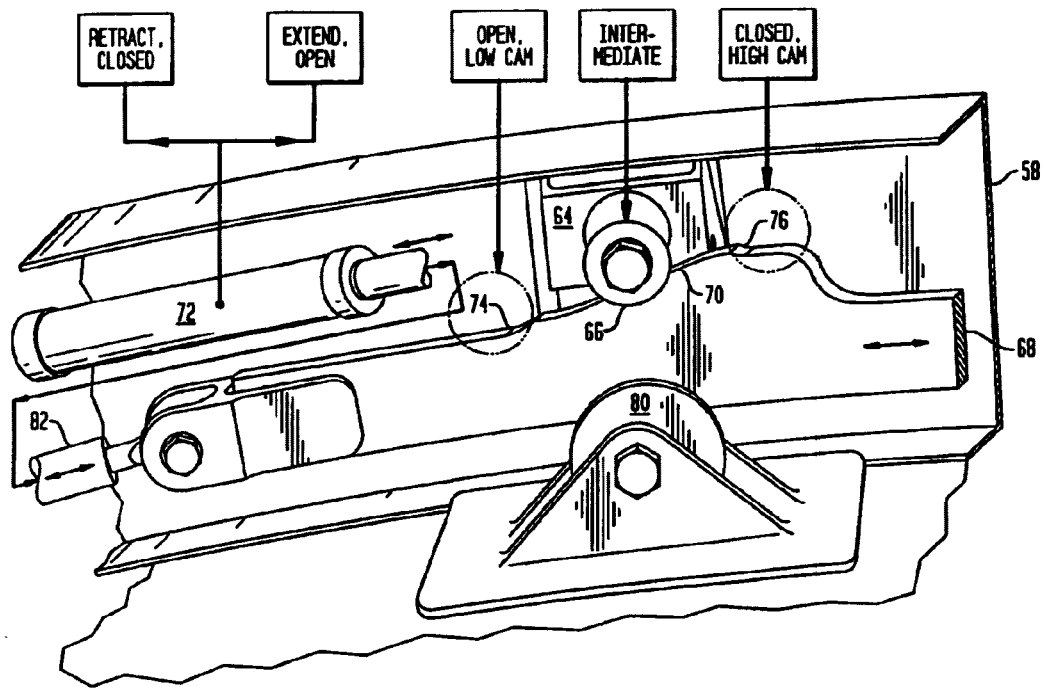

An annular outer duct 50 is disposed at the aft end of the fan nacelle coextensive with the outer skin 40 for maintaining an aerodynamically smooth outer mold line (OML) or outer surface of the nacelle having minimal aerodynamic drag. An auxiliary outlet 52 is disposed at the aft end of the outer duct 50 concentric about the fan bypass duct 36. As shown in FIGS. 3 and 4, the outer duct 50 is spaced radially outwardly from and surrounds the inner duct 36 over the row of apertures 48 to form a bypass channel 54 which begins at the apertures 48 and terminates at the outlet 52.

A plurality of doors or flaps 56 are hinged at upstream ends thereof to selectively cover and uncover corresponding ones of the apertures 48 and selectively bypass a portion of the exhaust flow 32 from the inner duct 36 through the outer duct 50 in confluent streams from both the main and auxiliary outlets 46,52.

In this way, the auxiliary outlet 52 provides a temporary increase in the overall discharge flow area for the fan bypass air 32 specifically during takeoff operation of the aircraft. The increased flow area of the main and auxiliary outlets temporarily reduces the velocity of the fan exhaust and therefore reduces the associated noise therefrom.

Furthermore, bypassing a portion of the fan exhaust through the outer duct 50 energizes the ambient airflow 32 outside the nacelle and reduces the thickness of the associated boundary layer. In this way, the external ambient air is locally accelerated in velocity where it meets the higher velocity fan exhaust discharged from the main outlet 46, which in turn reduces the differential velocity and shearing between the two confluent streams for further enhancing noise attenuation.

FIG. 3 illustrates the open flaps 56 for bypassing a portion of the fan exhaust 32 from the inner duct 36 through the outer duct 50 during takeoff operation. FIG. 4 illustrates the flaps 56 closed in their respective apertures 48 after takeoff operation, with the entirety of the fan exhaust 32 being discharged through the inner duct 36 and the main outlet at the aft end thereof.

Figure 5:
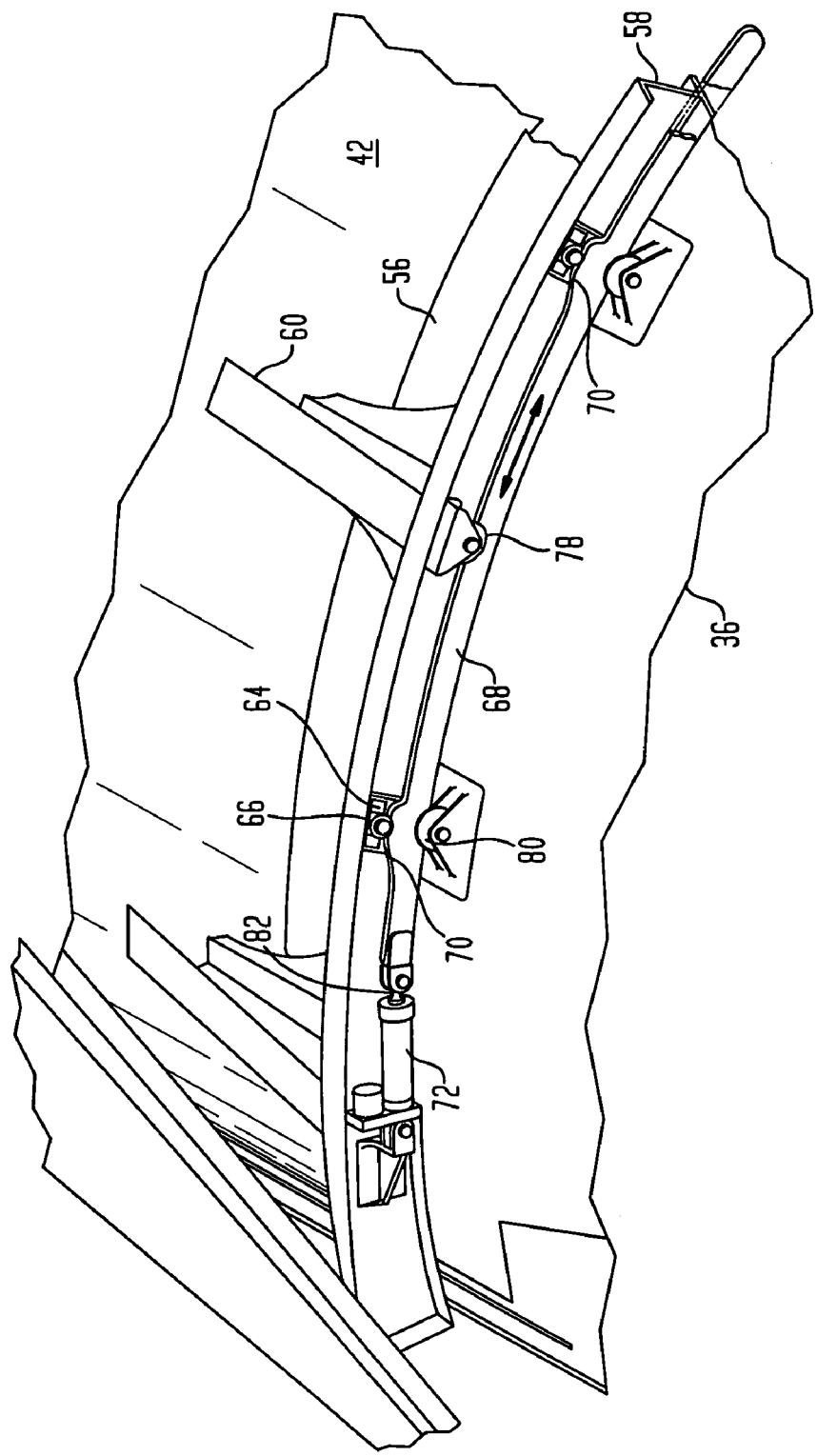
FIG. 5 is a forward-facing-aft isometric view of the fan nozzle illustrated in FIG. 2 including a portion of the rotary actuation system for the flaps therein.
Figure 6:
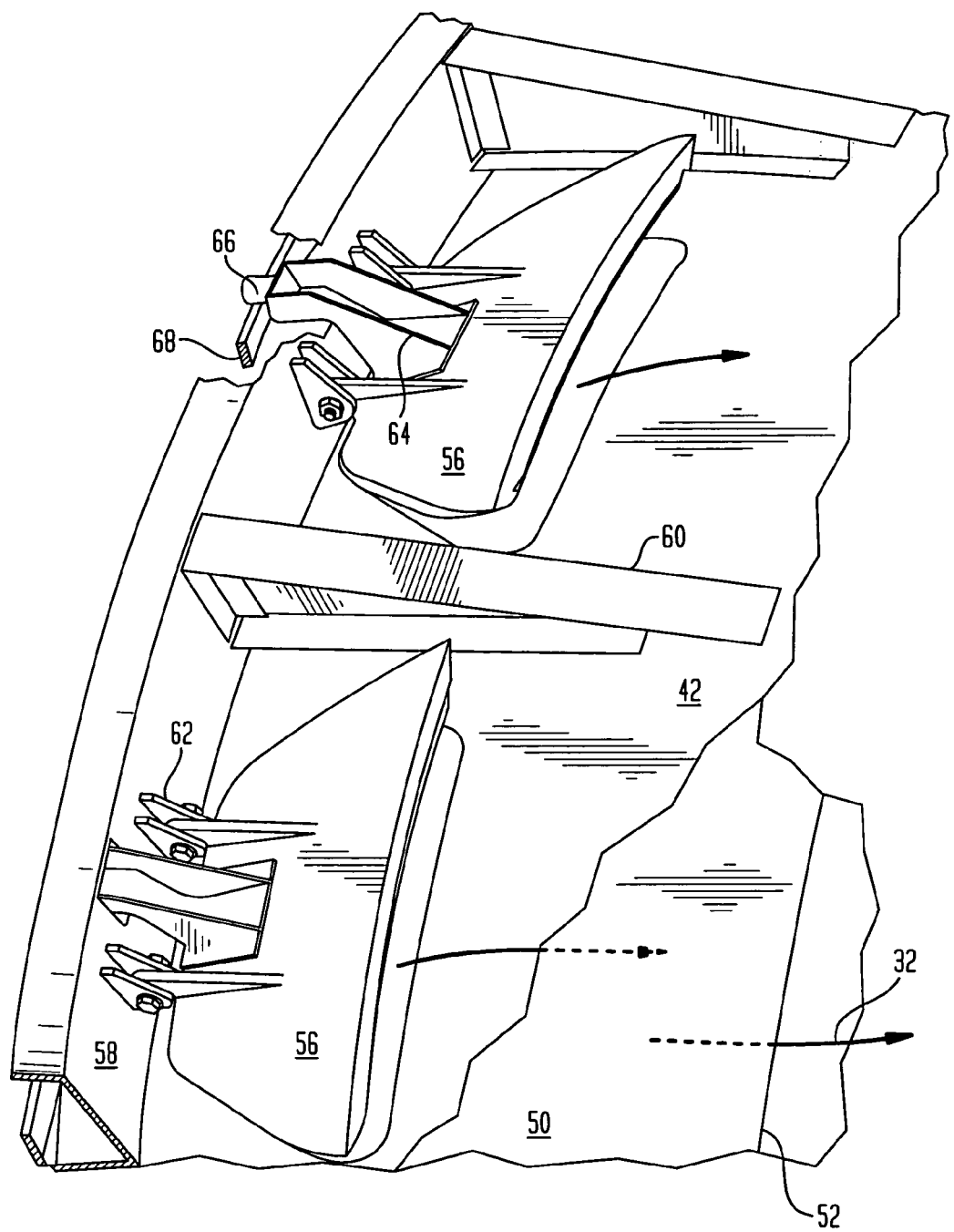
FIG. 6 is an isometric view of the open flaps illustrated in FIG. 3 in more detail.

As illustrated in FIGS. 5 and 6, the fan nozzle preferably includes a radial frame 58 which extends circumferentially between the outer and inner ducts immediately forward of the row of apertures 48. The individual flaps 56 are suitably hinged at their upstream ends to the radial frame 58. A plurality of longitudinal frames 60 extend axially rearwardly from the radial frame, and are disposed circumferentially between corresponding ones of the apertures 48. The longitudinal frames are tapered thinner in the aft direction to match the contour of the outer duct 50 which converges in the aft direction.

The radial and longitudinal frames cooperate together to provide structural support for introduction of the row of apertures 48, while supporting the outer duct 50 and the row of flaps. The longitudinal frames 60 are preferably imperforate to prevent crossflow between the circumferentially adjacent apertures 48 and to confine exhaust flow rearwardly through the corresponding bypass channels 54 disposed between the row of longitudinal frames 60.

As best illustrated in FIG. 6, each of the flaps 56 is pivotally joined at forward ends thereof to the radial frame 58 by a pair of circumferentially spaced hinges 62. The hinges may have any suitable configuration such as devises fixedly mounted to the radial frame and rotatably joined to flanges extending from the outer surface of the flaps, with hinge pins or bolts therebetween.

Each flap 56 also includes a generally L-shaped or gooseneck control arm 64 extending radially outwardly from the outer surface thereof between the two hinges. The control arm 64 is fixedly joined to or integral with the flap 56 and extends in part radially outwardly therefrom and in part axially forwardly through a corresponding access aperture in the radial frame.

As initially shown in FIGS. 5 and 6 the distal end of the control arm 64 where it passes through the radial frame 58 includes a cam follower 66 affixed thereto. For example, the cam follower 66 may be in form of a cam roller or wheel rotatably mounted to the distal end of the control arm 64 by a corresponding pin or bolt suitably joined thereto.

The flaps 56 extend aft from the aft side of the radial frame as illustrated in FIGS. 5 and 6 and may pivot open and closed around their corresponding hinges 62. This is effected by a circumferentially arcuate unison or control bar 68 mounted circumferentially around the inner duct 36 adjacent to the forward side of the radial frame.

Figure 7:
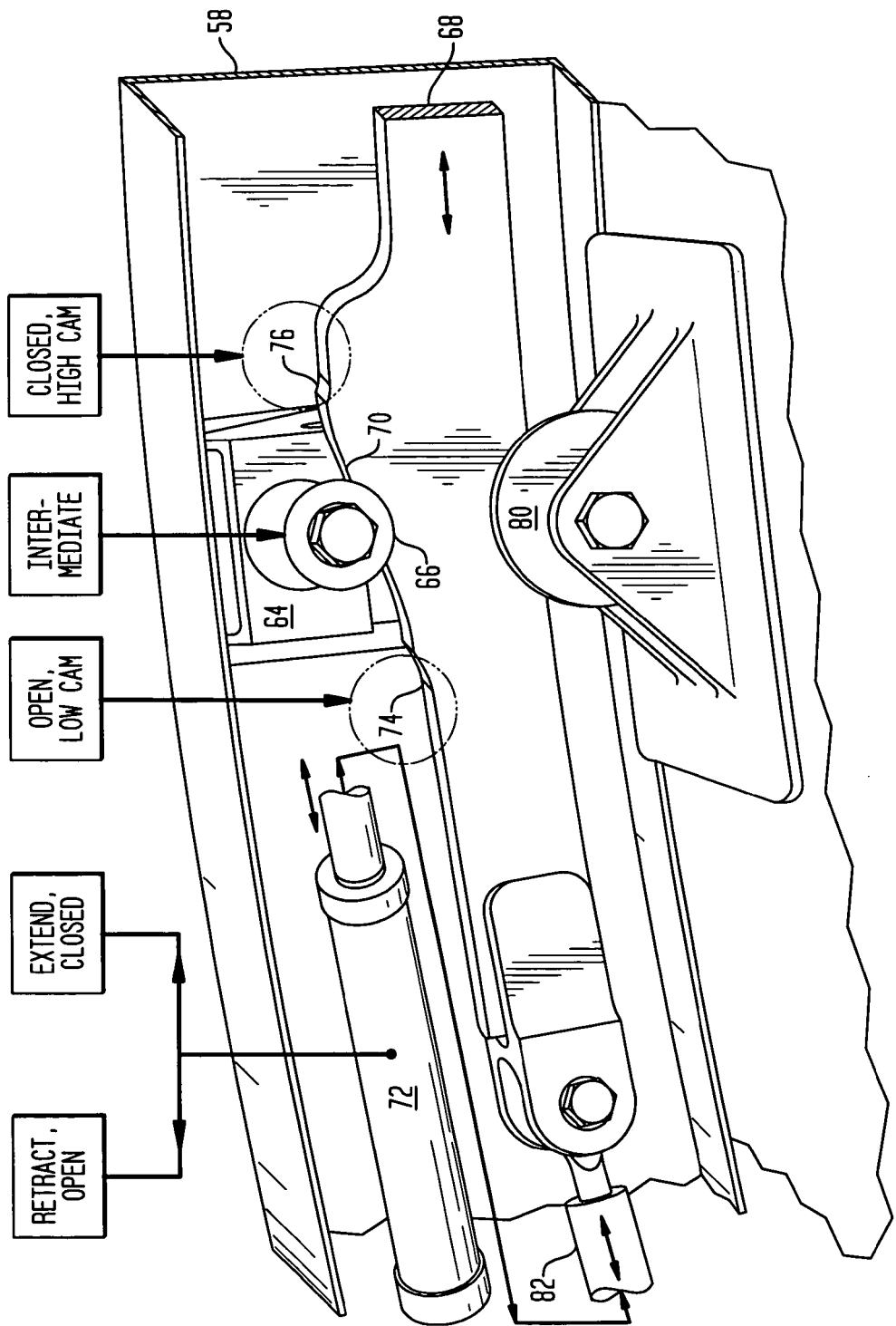
FIG. 7 is an enlarged isometric view of the proximal end of the unison bar illustrated in FIG. 5 along with one of the cams thereof, and an exemplary method of operation illustrated schematically.

As shown in FIGS. 5 and 7, the control bar includes a plurality of radial cams 70 spaced circumferentially apart in preferably radial engagement with corresponding ones of the cam followers 66 affixed to the several flaps 56.

Means in the form of a linear actuator 72 are operatively joined to the control bar 68 for selectively rotating the bar in a first clockwise direction illustrated in FIG. 7 to pivot or deploy open the full row of flaps 56 in unison about their corresponding hinges. The actuator 72 may be operated in reverse to rotate the bar in an opposite second or counter-clockwise direction also illustrated in FIG. 7 to pivot or retract closed the full row of flaps 56.

When the flaps 56 are closed as illustrated in FIG. 4, they cover the respective apertures 48 and block discharge of the exhaust flow 32 therethrough. When the flaps 56 are open as illustrated in FIG. 3, the aperture 48 are open for permitting bypass of a portion of the exhaust flow 32 through the respective bypass channels 54 and out the auxiliary outlet 52.

The common unison bar 68 therefore permits synchronous deployment and retraction of the row of flaps 56 when desired by the simple circumferential rotation or rotary movement of the control bar 68 itself. The corresponding cam followers 66 on each of the control arms 64 maintain engagement or contact with the common control bar 68 for coordinating the simultaneous movement of the several flaps.

An exemplary one of the radial cams 70 is illustrated in more detail in FIG. 7, and is in the preferred form of a radial incline or ramp extending circumferentially along a corresponding portion of the outer perimeter of the control bar 68. The several cams 70 along the outer perimeter of the common control bar are preferably identical to each other, and each similarly varies in radial height from low to high.

The low cam height relative to the axial centerline axis of the bypass duct positions the corresponding cam followers 66 radially inwardly as further illustrated in FIG. 3 to pivot open the row of flaps radially outwardly. In contrast, the high cam height positioning of the cam followers 66 as additionally illustrated in FIG. 4 raises those followers radially outwardly to pivot closed the row of flaps radially inwardly.

The slope of the ramp may be selected to balance actuator stroke and actuator force. Shallow slope may be used to decrease actuator force with increased mechanical advantage, but with an increase in actuator stroke. Steeper slope may be used to decrease actuator stroke, but with increased actuator force due to decreased mechanical advantage.

In this way, the simple rotary movement of the control bar 68 illustrated in FIG. 5 permits simultaneous deployment and retraction of the row of flaps 56 with relatively few actuation components contained in a small or compact space within the outer and inner skins of the fan nacelle and closely adjacent to the flaps themselves. Furthermore, the radial cams 70 enjoy substantial mechanical advantage or leverage for retracting closed the row of flaps 56 even against the substantial pressure forces acting along the inner surfaces thereof by the pressurized exhaust flow being discharged during operation.

Correspondingly, the actuator 72 requires low actuation forces to turn the actuation control bar 38. And, the radial frame 58 not only locally increases the strength of the fan nacelle around the row of radial apertures 48, but also increases the strength of the fan nacelle directly adjacent to the control bar 68 which carries actuation forces circumferentially therethrough during operation.

In the exemplary embodiment illustrated in FIG. 7, each of the cams 70 includes a local up-step or low detent 74 at the base of the cam ramp 70 itself at the low cam height position. The ramp 70 increases in radial height smoothly from the low step 74 at its base to a corresponding down-step or high detent 76 at the top of the ramp followed by the high cam height portion thereof.

In this way, when the flaps are initially closed for a majority of operation of the engine, the cam follower 66 is located on the high cam land illustrated in phantom line in FIG. 7 and locks closed the corresponding flap associated therewith. In order to open those closed flaps, the control bar 68 is rotated clockwise in FIG. 7 which requires the application of additional closing force on the cam follower 66 as it rises slightly to overcome the low step 76, now acting as an up-step in reverse motion. This additional closing movement of the corresponding flap may be permitted by introducing corresponding resiliency in a flexible seal mounted between the flap and its seat around the radial aperture.

As the control bar 68 is further rotated clockwise in FIG. 7 the cam roller 66 is then permitted to travel radially inwardly as the height of the ramp 70 decreases until reaching the base of the ramp at which the local high step 74 is located. In this position, the cam follower 66 is located radially inwardly which pivots radially outwardly the corresponding flap to its fully open position.

In order to close the open flaps, the control bar 68 is pulled counterclockwise in FIG. 7 by its actuator 72 to force the cam follower 66 radially outwardly as it rides along the increasing height of the cam ramp 70. An initial increase in actuation force is required in the actuator 72 to lift the cam follower 66 over the initial low step 74 at the base of the cam to unlock the flaps from their locked open positions.

Accordingly, both the low step 74 and the high step 76 provide local locking of the flaps in their closed and opened positions, respectively, and therefore the actuator 72 need not be energized in these two locked positions. Furthermore, separate locks for locking the flaps in their opposite closed and opened positions are not required, but may be introduced for redundancy.

And, if desired, the control bar 68 may be positioned by its actuator 72 at any intermediate circumferential position along the length of the cam ramp 70 for positioning the flaps at variable pivoted positions between their closed and opened positions for further varying discharge flow area of the fan nozzle.

As illustrated in FIG. 5, the unison bar 68 is preferably mounted to the perimeter of the inner duct 36 for rotary movement therearound by a plurality of radially outer and inner rollers or wheels 78,80 spaced circumferentially apart from each other. The outer wheels 78 may be suitably rotatably mounted to the radial frame 58 and suspended radially outwardly above the perimeter of the control bar 68 between the radial cams. Correspondingly, each of the inner wheels 80 may be suitably mounted to the external surface of the inner duct 36 in corresponding brackets or devises fixedly mounted thereto.

The outer and inner wheels 78,80 illustrated in FIG. 5 may be in the form of typical pulleys with annular grooves therein which are complementary with the shape of the control bar 68 for both radially and axially trapping the bar to limit its motion to circumferential rotary or arcuate movement around the inner ducts 36. The control bar 68 may have a radially tall, rectangular configuration for increasing its strength or moment of inertia in the radial direction, with the outer perimeter or edge of the bar being trapped by the outer wheels 78, and the inner edge of the bar being trapped by the inner wheels 80.

The distal end of the control bar 68 is illustrated in FIG. 5 as being freely supported and unattached without restraint due to the several outer wheels and several inner wheels which collectively support the full circumferential extent of the control bar 68 around the circumference of the inner duct. As indicated above, the fan nacelle my be formed in two generally C-halves and, therefore two arcuate control bars 68 would be used for the two sides of the full nacelle, each control bar with its separate actuator 72.

In the preferred embodiment illustrated in FIG. 5, a single actuator 72 is suitably joined to the proximal end of the corresponding control bar 68, with the circumferentially opposite distal end of the bar being free, or freely supported or suspended from the outer and inner wheels.

The exemplary linear actuator 72 illustrated in FIGS. 5 and 7 may have any conventional configuration such as hydraulic, pneumatic, or electrical, with an elongate output rod 82 suitably joined to the proximal end of the control bar 68 by a typical spherical rod end for example.

The actuator 72 is suitably configured to extend the output rod 82 to rotate the control bar in the first or clockwise direction, and then to retract the rod to rotate the bar in the opposite second or counterclockwise direction. Little stroke or range of extension and retraction of the output rod 82 is required between the closed and open positions of the flaps in view of the kinematic operation of the respective cams 70 with their followers 66 mounted on the control arms 64.

As best illustrated in FIGS. 3 and 4, the cam rollers 66 are axially elongate to maintain rolling contact with the unison bar 68 as the flaps pivot open and closed in response to rotary movement of the unison bar around the bypass duct. The rotary movement of the control bar 68 circumferentially around the axial centerline axis of the fan nozzle is converted by the radial cams and followers to pivotal movement of the several flaps 56 around their respective hinges having rotary axes which are orthogonal to the rotary axis of the control bar.

As shown in FIGS. 3 and 7, the cam followers 66 are unrestrained radially outwardly from the unison bar 68, and the flaps 56 are hinged to the radial frame 58 to permit pressure force F of the exhaust flow inside the inner duct 36 to power open the flaps as the unison bar is rotated in the first direction. As initially shown in FIG. 4, the radial cam 70 is positioned at its maximum radial height to drive or force the cam follower 66 radially outwardly and correspondingly force the control arm 64 and its corresponding flap 56 radially inwardly to the closed position around the hinges 62.

In order to open the flaps 56 as illustrated in FIG. 3, the radial cam 70 is driven towards its radially inner position of minimal height which then permits the pressure force F acting over the inner surface of the flaps 56 to drive those flaps radially outwardly, which in turn drives the corresponding cam followers 66 atop the radial cam 70. The substantial pressure forces F, alone, of the exhaust flow 32 are sufficient to maintain opened the flaps 56 while also maintaining engagement of the cam followers 66 on their respective radial cams 70.

However, when the engine is powered off on the ground, the fan discharge is terminated and no pressure forces are available for opening the flaps. If the control bar 68 is driven to its open position, only those flaps which are upside down relative to gravity would then open by the gravitational forces thereon.

Figure 8:
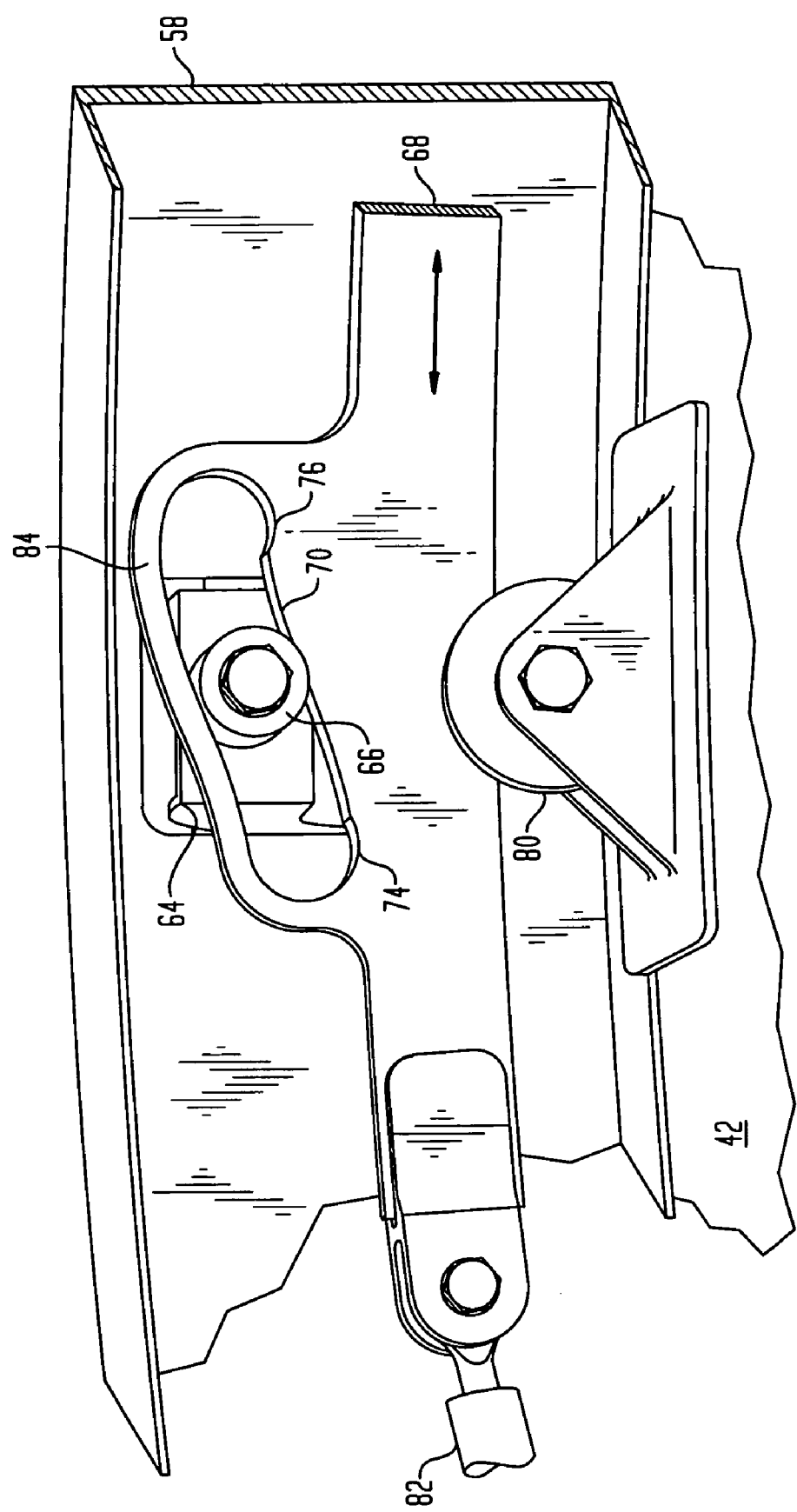
FIG. 8 is an isometric view of the proximal end of the unison bar, like FIG. 7, in accordance with an alternate embodiment of the radial cams.

Accordingly, FIG. 8 illustrates an alternate embodiment in which the control bar 68 is slightly modified to include a plurality of corresponding retainer tracks 84 spaced above respective ones of the radial cams to define corresponding slots therewith in which the corresponding cam follower 66 is additionally trapped or restrained radially inwardly. The track 84 is an integral part of the control bar 68 and is generally parallel to the radial cam 70 between its low and high heights.

In this way, the control bar 68 operates in the same manner disclosed above to open and close the flaps during operation of the engine. And, the introduction of the retaining track 84 permits the actuator to drive or power open the flaps irrespective of any pressure forces in the exhaust flow.

In FIG. 8, as the actuator rod 82 pushes the control bar 68 to the right in the clockwise direction, force is transferred from the actuator through the retainer track 84 to drive radially inwardly the cam follower 66, which in turn pivots open the corresponding flap attached to the control arm 64.

Figure 9:
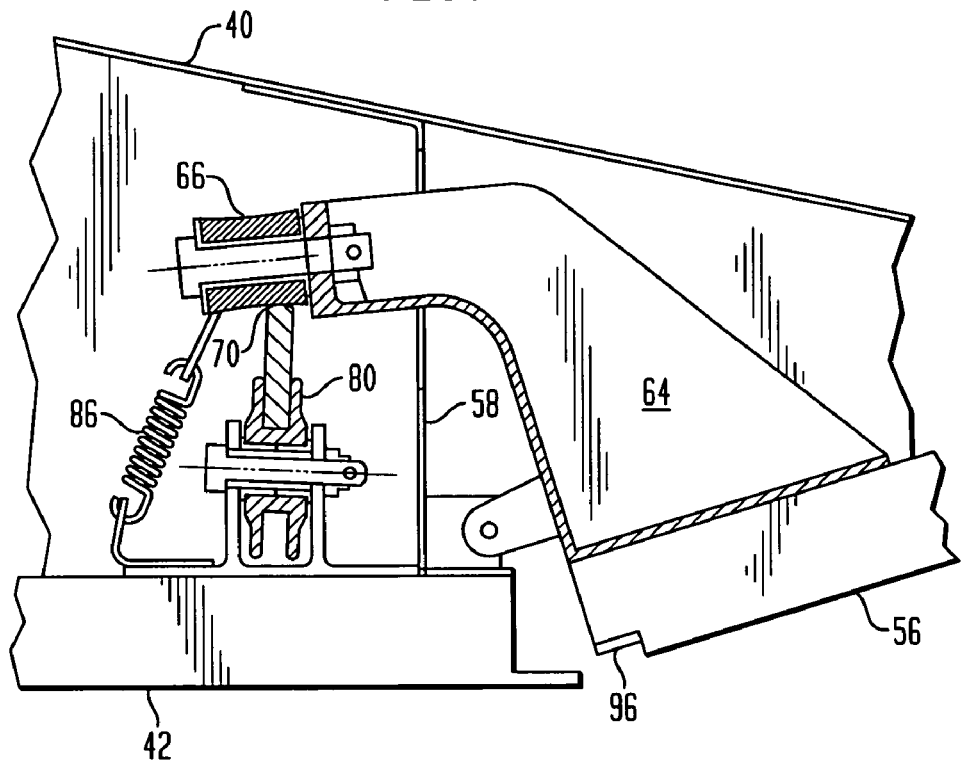
FIG. 9 is a partly sectional axial view, like FIG. 3, of an alternate embodiment of the actuation system including corresponding deployment springs for opening the flaps.
Figure 10:
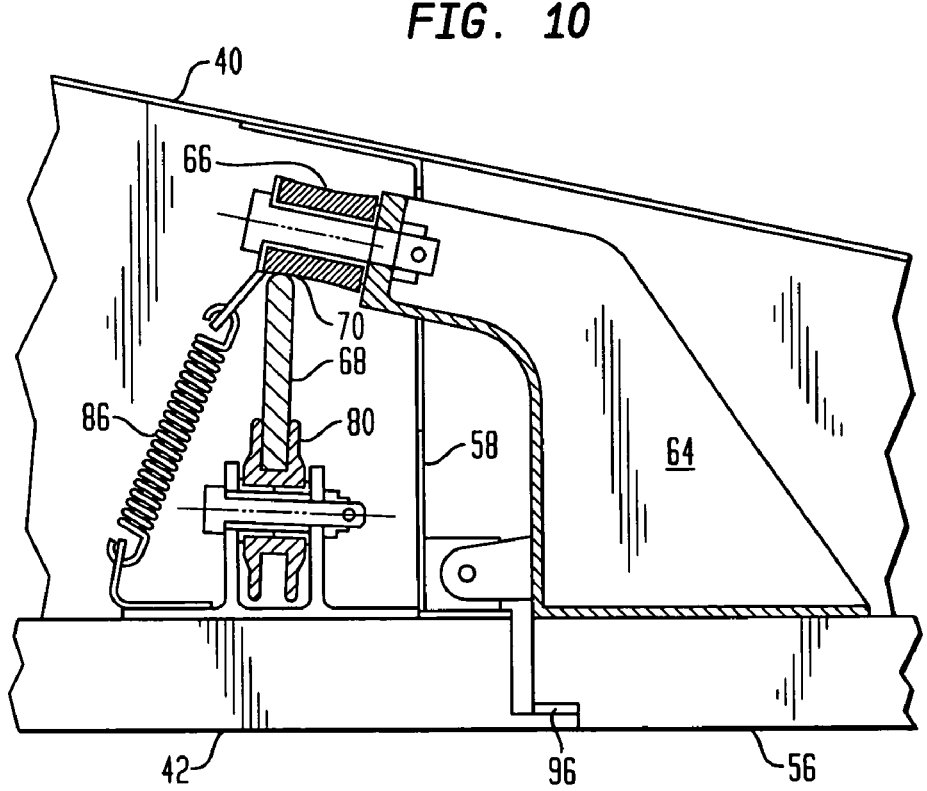
FIG. 10 is a partly sectional axial view, like FIG. 9, of further extension of the deployment springs by the radial cam upon closing the flaps.

FIGS. 9 and 10 illustrate yet another embodiment of the actuation system which is identical to that illustrated in FIG. 5, for example, but additionally includes a plurality of deployment or tension springs 86 suitably mounted between respective ones of the cam followers 66 and the inner duct 36 to restrain the cam followers radially inwardly irrespective of any pressure forces of the exhaust flow in the inner duct. Each tension spring 86 is suitably mounted at its outer end by a bracket or hook attached to the common bolt supporting the cam follower 66, and at its inner end to another bracket or hook fixedly joined to the outer surface of the inner duct 36.

In this way, the tension spring 86 may be stretch-mounted between the cam follower and the inner duct for biasing open the flaps 56 when the radial cam 70 is at its low height position as shown in FIG. 9, and being further stretched in the closed position of the flaps 56 when the radial cams are at their high positions. Portions of flexible seals 96 in seats surrounding the apertures are shown which seal closed the flaps, and also permit initial super-closing of the flaps by the high step 76 shown in FIG. 7 as described above.

In the various embodiment illustrated in FIGS. 1–10, the rotary actuation system is introduced in the fan nozzle 38 in which the outer duct 50 surrounds the inner exhaust duct 36 to form the bypass channel 54 extending aft from the apertures 48 and terminating at the auxiliary outlet 52 for providing variable area operation thereof for the benefits disclosed.

The rotary adjustable exhaust nozzle disclosed above may be used in various turbofan engines with a long or short fan nacelles. And, the nozzle may be used in engines with or without thrust reversers.

Figure 11:
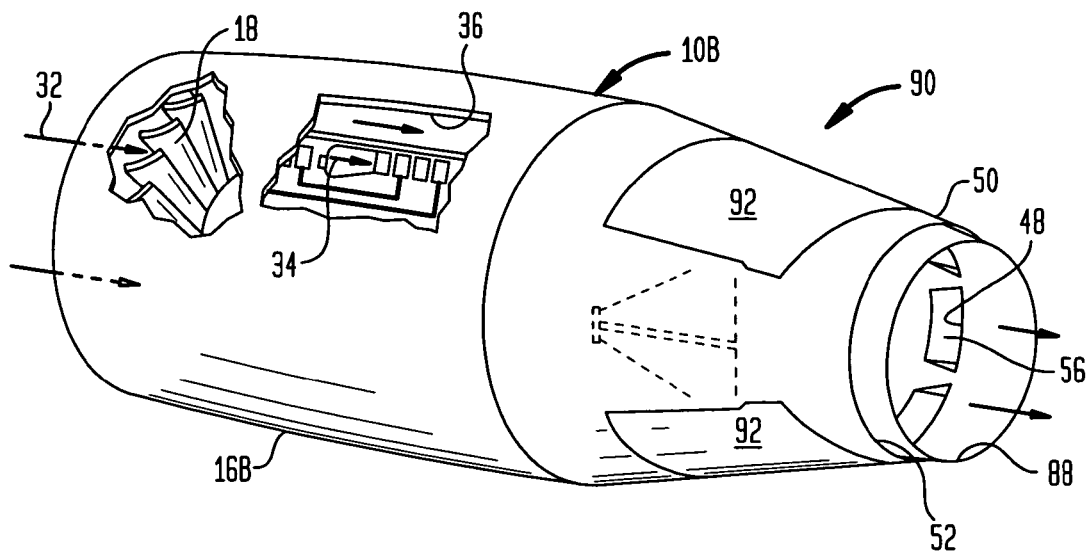
FIG. 11 is an isometric view of a long duct turbofan engine including a thrust reverser and a corresponding embodiment of the rotary adjustable exhaust nozzle disposed downstream therefrom.

For example, FIG. 11 illustrates another turbofan engine 10B in which the fan nacelle 16B extends the full length of the engine to a common exhaust outlet 88 at the aft end thereof. The fan bypass duct 36 terminates inside the engine upstream from the common outlet 88 for mixing the fan exhaust with the core exhaust inside the engine and upstream from the common outlet. A thrust reverser 90 is located upstream from the common outlet and includes a pair of thrust reverser doors 92 covering corresponding side openings in the engine.

Figure 12:
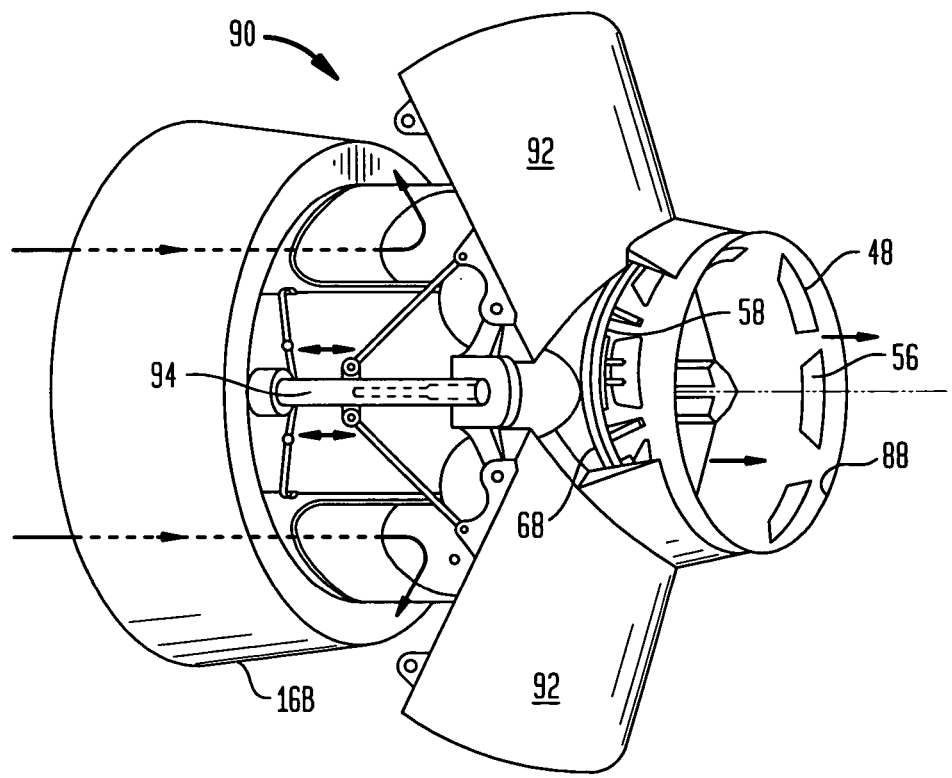
FIG. 12 is a isometric view of the thrust reverser illustrated in FIG. 11 in its deployed position upstream from the adjustable exhaust nozzle.

As shown in FIG. 12, a pair of actuators 94 are disposed on opposite sides of the engine for providing means to selectively open the doors to uncover the side openings for reversing thrust from the combined fan exhaust and core engine exhaust during landing operation.

The exemplary thrust reverser illustrated in FIG. 12 may have any conventional configuration, and includes integral forward and aft barrels which define an inner duct integrally joined together by lateral beams defining the two side openings which are covered by the two doors 92. The inner duct receives the exhaust from both the core engine and the fan bypass duct.

The rotary adjustable exhaust nozzle disclosed above may be suitably incorporated into the aft end of the long duct turbofan engine illustrated in FIGS. 11 and 12. For example, the outer duct 50 is introduced as the aft end of the nacelle 16B which forms a smooth outer mold line with the forward barrel and doors when stowed closed. The inlet apertures 48 are formed in the inner duct and are closed by the flaps 56 located between the inner and outer ducts in the same manner described above in the first embodiment.

During takeoff operation of the engine as illustrated in FIG. 11, the thrust reverser doors are locked closed and flush in the nacelle, and the flaps may be selectively opened for temporarily increasing the total exhaust flow area from the engine by introducing the additional area from the auxiliary outlet 52 surrounding the common outlet 88.

The various embodiments of the exhaust nozzle disclosed above permit a temporary increase in total exhaust flow area during takeoff operation of the engine for reducing the differential velocity between the ambient freestream airflow and the engine exhaust.

In FIG. 1, the introduction of the confluent fan nozzle decreases the differential velocity between the fan air and the ambient freestream airflow for attenuating noise during takeoff operation, while minimizing base drag during cruise operation.

In the FIG. 11 embodiment, the confluent exhaust nozzle decreases the differential velocity between the common exhaust flow and the ambient freestream air for also attenuating noise during takeoff operation.

The flaps and the rotary actuation system therefor as disclosed above are fully contained between the outer and inner skins of the nacelle and occupy little space, introduce little additional weight, and are relatively simple to incorporate in the available limited space.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A gas turbine engine exhaust nozzle comprising:
    an exhaust duct having an outlet at an aft end thereof for discharging exhaust flow, and including a row of radial apertures spaced upstream from said outlet;
    a radial frame extending circumferentially around said duct and spaced forward from said apertures;
    a plurality of flaps hinged at upstream ends thereof to said frame to selectively cover and uncover said apertures for controlling exhaust flow discharge therethrough, and each flap includes a cam follower affixed thereto;
    an arcuate unison bar mounted circumferentially around said duct adjacent to said frame, and including a plurality of cams spaced circumferentially apart in engagement with corresponding ones of said cam followers affixed to said flaps and
    an actuator joined to said bar for selectively rotating said bar in a first direction to pivot open said flaps, and in an opposite second direction to pivot closed said flaps to cover said apertures.

2. A nozzle according to claim 1 wherein each of said flaps is pivotally joined to said frame by a pair of hinges, and includes a control arm extending radially outwardly therefrom to position said cam follower along said unison bar.

3. A nozzle according to claim 2 wherein each of said cams comprises a ramp extending circumferentially along a portion of the outer perimeter of said bar, and varies in radial height from low to high, with low cam height positioning said cam follower radially inwardly to pivot open said flaps radially outwardly, and high cam height positioning said cam followers radially outwardly to pivot closed said flaps radially inwardly.

4. A nozzle according to claim 3 wherein said cams include an up-step at the base of said ramp at said low cam height, and a down-step at the top of said ramp at said high cam height.

5. A nozzle according to claim 3 wherein said unison bar is mounted to said duct by a plurality of outer and inner wheels spaced circumferentially apart.

6. A nozzle according to claim 5 wherein said outer and inner wheels include grooves being complementary with said bar for radially and axially trapping said bar to limit motion thereof to circumferential rotary movement around said duct.

7. A nozzle according to claim 3 wherein said actuator is joined to a proximal end of said bar, and an opposite distal end of said bar is free.

8. A nozzle according to claim 7 wherein said actuator includes an output rod joined to said proximal end of said bar, and is configured to extend said rod to rotate said bar in said first direction, and to retract said rod to rotate said bar in said second direction.

9. A nozzle according to claim 3 wherein said cam follower comprises a cam roller mounted to a distal end of said control arm for each of said flaps.

10. A nozzle according to claim 9 wherein said cam roller is axially elongate to maintain rolling contact with said unison bar as said flaps pivot open and closed in response to rotary movement of said unison bar around said duct.

11. A nozzle according to claim 3 wherein said cam followers are unrestrained radially outwardly from said unison bar, and said flaps are hinged to said frame to permit pressure of said exhaust flow inside said duct to power open said flaps as said unison bar is rotated in said first direction.

12. A nozzle according to claim 3 wherein said unison bar further comprises a plurality of retainer tracks spaced above respective ones of said cams to trap said cam followers radially inwardly.

13. A nozzle according to claim 3 further comprising a plurality of springs mounted between respective ones of said cam followers and said exhaust duct to restrain said cam followers radially inwardly.

14. A nozzle according to claim 3 further comprising an outer duct surrounding said exhaust duct to form a bypass channel extending aft from said apertures and terminating at an auxiliary outlet.

15. A gas turbine engine exhaust nozzle comprising:
    an inner exhaust duct having a main outlet at an aft end thereof for discharging exhaust flow, and including a row of radial apertures spaced upstream from said main outlet;

an outer duct surrounding said inner duct to form a bypass channel extending aft from said apertures and terminating at an auxiliary outlet;

a radial frame extending radially around said inner duct from said apertures;

a plurality of flaps hinged at upstream ends thereof to said frame to selectively cover and uncover said apertures for controlling exhaust flow discharge therethrough, and each flap includes a cam follower affixed thereto;

an arcuate control bar mounted circumferentially around said inner duct adjacent to said frame, and including a plurality of cams spaced circumferentially apart in engagement with corresponding ones of said cam followers affixed to said flaps; and an actuator joined to said bar for selectively rotating said bar in a first direction to pivot open said flaps in unison, and in an opposite second direction to pivot closed said flaps in unison to cover said apertures.

16. A nozzle according to claim 15 wherein:

each of said flaps is pivotally joined to said frame by a pair of hinges, and includes a control arm extending radially outwardly therefrom to position said cam follower along said control bar; and said control bar is mounted to said inner duct by a plurality of outer and inner wheels spaced circumferentially apart.

17. A nozzle according to claim 16 wherein:

said cam follower comprises a cam roller mounted to a distal end of said control arm for each of said flaps; and each of said cams comprises a ramp extending circumferentially along a portion of the outer perimeter of said bar, and varies in radial height from low to high, with low cam height positioning said cam rollers radially inwardly to pivot open said flaps radially outwardly, and high cam height positioning said cam rollers radially outwardly to pivot closed said flaps radially inwardly.

18. A nozzle according to claim 17 wherein said actuator includes an output rod joined to a proximal end of said bar, and is configured to extend said rod to rotate said bar in said first direction, and to retract said rod to rotate said bar in said second direction.

19. A nozzle according to claim 18 wherein said cams include an up-step at the base of said ramp at said low cam height, and a down-step at the top of said ramp at said high cam height.

20. A nozzle according to claim 19 wherein:

said outer and inner wheels include grooves being complementary with said bar for radially and axially trapping said bar to limit motion thereof to circumferential rotary movement around said duct; and said cam roller is axially elongate to maintain rolling contact with said control bar as said flaps pivot open and closed in response to rotary movement of said control bar around said duct.

* * * * *

UNITED STATES PATENT AND TRADEMARK OFFICE
CERTIFICATE OF CORRECTION

PATENT NO. : 6,966,175 B2
DATED : November 22, 2005
INVENTOR(S) : Jean-Pierre Lair It is certified that error appears in the above-identified patent and that said Letters Patent is hereby corrected as shown below:

Delete the drawings consisting of Figures 3 and 7, and replace with the following drawings, attached.

Signed and Sealed this

Thirteenth Day of June, 2006

JON W. DUDAS
*Director of the United States Patent and Trademark Office*